(12) United States Patent
Hawkins

(10) Patent No.: US 11,890,699 B1
(45) Date of Patent: Feb. 6, 2024

(54) METHOD OF MANUFACTURING A WATERPROOF STRAPPED ACCESSORY

(71) Applicant: Dustin Hawkins, Fort Pierce, FL (US)

(72) Inventor: Dustin Hawkins, Fort Pierce, FL (US)

( * ) Notice: Subject to any disclaimer, the term of this patent is extended or adjusted under 35 U.S.C. 154(b) by 663 days.

(21) Appl. No.: 16/988,113

(22) Filed: Aug. 7, 2020

Related U.S. Application Data

(60) Provisional application No. 62/902,557, filed on Sep. 19, 2019.

(51) Int. Cl.
| | | |
|---|---|---|
| *B23K 26/38* | (2014.01) | |
| *B29C 65/20* | (2006.01) | |
| *B08B 3/08* | (2006.01) | |
| B23K 103/00 | (2006.01) | |
| B23K 101/34 | (2006.01) | |

(52) U.S. Cl.
CPC ............... *B23K 26/38* (2013.01); *B08B 3/08* (2013.01); *B29C 65/20* (2013.01); *B23K 2101/35* (2018.08); *B23K 2103/30* (2018.08)

(58) Field of Classification Search
CPC .......................... B23K 26/38; B23K 2101/35; B23K 2103/30; B08B 3/08; B29C 65/20
USPC .................................................... 219/121.67
See application file for complete search history.

(56) References Cited

U.S. PATENT DOCUMENTS

| | | | | | |
|---|---|---|---|---|---|
| 1,930,263 | A | * | 10/1933 | Burnish | B23K 11/0873 219/67 |
| 2,593,207 | A | * | 4/1952 | Silver | D06M 15/595 428/479.6 |
| 3,865,662 | A | * | 2/1975 | Segal | B29C 65/78 156/304.6 |
| 4,158,762 | A | | 6/1979 | Saunders | |
| 4,937,435 | A | * | 6/1990 | Goss | H05B 3/34 219/535 |
| 5,007,666 | A | * | 4/1991 | Kyfes | B29C 65/58 285/133.11 |
| 5,017,423 | A | * | 5/1991 | Bossmann | D06M 10/005 428/401 |
| 5,101,094 | A | * | 3/1992 | Keller | D06H 7/22 242/384.6 |
| 5,523,125 | A | | 6/1996 | Kennedy et al. | |
| 6,140,602 | A | | 10/2000 | Costin | |
| 6,375,056 | B1 | | 4/2002 | Henri | |

(Continued)

*Primary Examiner* — Jimmy Chou
(74) *Attorney, Agent, or Firm* — John Rizvi; John Rizvi, P.A.—The Patent Professor®

(57) ABSTRACT

A method of manufacturing a waterproof strapped accessory and a waterproof strapped accessory formed according to the disclosed method are provided. Using a thermal laser cutter, a raw thermal polyurethane-coated nylon webbing material is cut, obtaining a desired shape of a strapped accessory. Holes may be cut through the strapped accessory using the thermal laser cutter. The thermal laser cutter seals the cut edges of the strapped accessory as well as any hole cut by the thermal laser cutter, rendering all or most edges waterproof. The strapped accessory is then inspected, and any unsealed edges sealed with a thermal rod. The strapped accessory is then cleaned of any residue and allow to cure under predetermined environmental conditions for a predetermined amount of time. Keepers and/or any desired hardware may be affixed to the strapped accessory. Indicia may also be imparted onto the strapped accessory by the thermal laser cutter.

10 Claims, 14 Drawing Sheets

(56) References Cited

U.S. PATENT DOCUMENTS

| | | | |
|---|---|---|---|
| 6,528,006 B1* | 3/2003 | Jansen | A61F 2/2415 427/596 |
| 6,681,668 B1* | 1/2004 | Smirle | D06H 7/22 83/16 |
| 6,777,647 B1 | 8/2004 | Messal et al. | |
| 8,197,621 B2* | 6/2012 | Jung | H05B 3/146 219/549 |
| 8,209,785 B2 | 7/2012 | Underwood et al. | |
| 8,378,258 B2 | 2/2013 | Sercel et al. | |
| 8,563,892 B2 | 10/2013 | Maschera et al. | |
| 8,779,328 B2 | 7/2014 | Anukhin et al. | |
| 8,803,115 B2 | 8/2014 | Leucht et al. | |
| 9,758,876 B2 | 9/2017 | Shorey et al. | |
| 9,955,761 B2 | 5/2018 | Maddox et al. | |
| 10,401,876 B1* | 9/2019 | Coleman | G05D 7/00 |
| 2003/0051372 A1* | 3/2003 | Lyden | G06Q 30/0621 36/27 |
| 2006/0157191 A1* | 7/2006 | Matsuo | B23K 26/382 438/464 |
| 2007/0234862 A1 | 10/2007 | Mikkelsen | |
| 2008/0128493 A1* | 6/2008 | Jones | B41M 5/24 428/29 |
| 2008/0302772 A1* | 12/2008 | Lion | D06Q 1/00 219/121.72 |
| 2009/0302579 A1* | 12/2009 | Lippert | B23C 3/30 280/728.1 |
| 2010/0163591 A1 | 7/2010 | Stutz et al. | |
| 2011/0203924 A1* | 8/2011 | Wohlstadter | G01N 21/66 83/13 |
| 2012/0043701 A1 | 2/2012 | Kanga | |
| 2012/0299273 A1* | 11/2012 | Lesnik | B60R 21/2165 219/200 |
| 2013/0001206 A1* | 1/2013 | Yamamoto | B23K 26/703 219/121.72 |
| 2013/0283548 A1* | 10/2013 | Wang | A43B 23/0255 12/142 R |
| 2015/0102022 A1* | 4/2015 | Crable | B23K 26/361 219/121.68 |
| 2015/0174705 A1* | 6/2015 | Schwartz | B23K 37/0408 219/121.67 |
| 2015/0306839 A1* | 10/2015 | Beliveau | A41D 31/065 428/319.3 |
| 2016/0262489 A1* | 9/2016 | Holmes | B29C 66/92655 |
| 2017/0188664 A1* | 7/2017 | Manz | A43D 25/07 |
| 2018/0135213 A1* | 5/2018 | Bell | A43B 1/0009 |
| 2018/0160653 A1* | 6/2018 | Zambrano | A01K 27/001 |

* cited by examiner

METHOD OF MANUFACTURING A WATERPROOF STRAPPED ACCESSORY

CROSS-REFERENCE TO RELATED APPLICATIONS

This application claims the benefit of United States Provisional Patent Application No. 62/902,557, filed on Sep. 19, 2019, which is incorporated herein by reference in its entirety.

FIELD OF THE INVENTION

The present invention relates generally to carrying straps and methods of manufacture of strapped accessories, and more particularly, to a method of manufacturing a waterproof strap and waterproof accessories provided with one or more straps.

BACKGROUND OF THE INVENTION

Many first responders, such as police and fire personnel, are often required to carry a large variety of equipment with them at all times in order to be prepared for a variety of situations. Such equipment may include radios, flashlights, a variety of knives or other cutting tools, Lifepack® monitors, etc. In the case of police officers, additional equipment in the form of handguns and handcuffs are also carried on their person in holders or holsters attached to a belt or strap worn by the officer.

Most of these pieces of equipment are carried on equipment belts or a series of straps having a variety of permanent or removable equipment holders, holsters, cases, etc. These belts and straps are typically formed from leather or synthetic materials that are absorbent or at the very least not naturally waterproof. Since the first responders operate in all weather conditions and environmental conditions that may include wet conditions, the belts and straps are subject to rot and/or decay. Thus, the first responders must continually treat their belts and straps to keep then waterproof. Oils or wax is typically used on leather while various waxes or silicones may be used on other absorbent materials to keep them waterproof. The outside edges of the straps, as well as any inside edges of holes through the straps for rivets or adjustments, need to be sealed to prevent water absorption. This is a time consuming and difficult task given the amount of edges and holes to be maintained.

Additionally, the first responders are in constant contact with a variety of people, such as injured victims, perpetrators, or bystanders. These people may be carrying a variety of diseases and other biological contaminants that can be transmitted through their bodily fluids to the first responders should their belts and straps come into contact with these people. If the belts and straps are not completely sealed, the diseases and other contaminants may be absorbed into the material of the belts and straps and threaten the safety of the first responders. It is often difficult or impossible to thoroughly clean and sanitize belts and straps formed from absorbent materials, particularly while in the field.

Accordingly, there is an established need for a waterproof and easily field cleanable or sterilizable material for the use in the construction of belts, accessory straps and/or equipment holders. There is a further established need for a method of manufacturing a waterproof and sealed belt, strap or accessory holder.

SUMMARY OF THE INVENTION

The present invention is directed to a method of manufacturing a waterproof strapped accessory and a waterproof strapped accessory formed according to the disclosed method. Raw thermal polyurethane-coated nylon webbing may be positioned into a jig and a desired shape of a strapped accessory may be cut utilizing a thermal laser cutter. The thermal laser cutter seals the cut edges of the strapped accessory as well as any holes cut by the thermal laser cutter. Indicia may also be imparted onto the strapped accessory by the thermal laser cutter. The strapped accessory may then be inspected and any unsealed edges sealed with a thermal rod. The strapped accessory may then be cleaned of any residue and allow to cure under predetermined environmental conditions for a predetermined amount of time. Keepers, formed from the nylon webbing by the disclosed method, may be added to the strapped accessory and sealed at opposed ends. Finally, any desired hardware may be affixed to the strapped accessory to produce a waterproof strapped accessory.

In a first implementation of the invention, a method of manufacturing a waterproof strapped accessory comprises a step of providing a raw thermal polyurethane-coated webbing material and a thermal laser cutter. An article, which consists in, or includes, a strap, is obtained by cutting the webbing material using the thermal laser cutter, wherein the cutting by the thermal laser cutter provides the article with at least one waterproof peripheral edge.

In a second aspect, the method may further include a step of sealing at least one edge of the article by applying a thermal rod to said at least one edge. In some embodiments, the thermal rod may be set to a temperature of 390° F.

In another aspect, the method may further include a step of inspecting a periphery of the article to identify an incompletely sealed peripheral edge of the article.

In another aspect, the method may further include a step of sealing the incompletely sealed peripheral edge by applying a thermal rod to said incompletely sealed peripheral edge. In some embodiments, the thermal rod may be set to a temperature of 390° F.

In another aspect, the method may further include a step of cleaning the article with a cleaning solution.

In yet another aspect, the cleaning solution may include an isopropyl alcohol solution.

In another aspect, the cleaning solution may include a 70% to 99% isopropyl alcohol solution.

In another aspect, the method may further include a step of applying the thermal laser cutter to the webbing material such that a hole is formed in the webbing material, the hole defined by an edge of the webbing material, and such that at least part of the edge of the webbing material is rendered waterproof by the thermal laser cutter.

In another aspect, the method may further include a step of sealing a remaining part of the edge defining the hole by applying a thermal rod to said edge defining the hole.

In yet another aspect, the method may further include obtaining a template, forming an opening in the template, wherein the opening is configured to accommodate the webbing material, and fitting the webbing material into the opening prior to using the thermal laser cutter.

In another aspect, the template may be made of at least one of an acrylic material and a polycarbonate material.

In another aspect, the opening and webbing material may be elongate in shape and a width of the opening may match a width of the webbing material.

In another aspect, the method may further include a step of tapering an end of the article to a narrower width by applying the thermal laser cutter to said end.

In yet another aspect, the method may further include a step of applying the thermal laser cutter on a surface of the webbing material to engrave indicia on the surface.

In another aspect, the method may further include a step of applying the thermal laser cutter on a surface of the webbing material to form a recess on the surface.

In another aspect, the method may further include mounting a keeper on the article, and sealing opposite ends of the keeper to each other by placing the opposite ends adjacent one another and applying a thermal rod to the opposite ends.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a waterproof, field cleanable, strapped accessory assembly that is fully sealed against moisture and is easily field cleanable to remove dirt and contaminants. The invention is also directed to a method of manufacturing a waterproof strapped accessory assembly.

Figure 1:
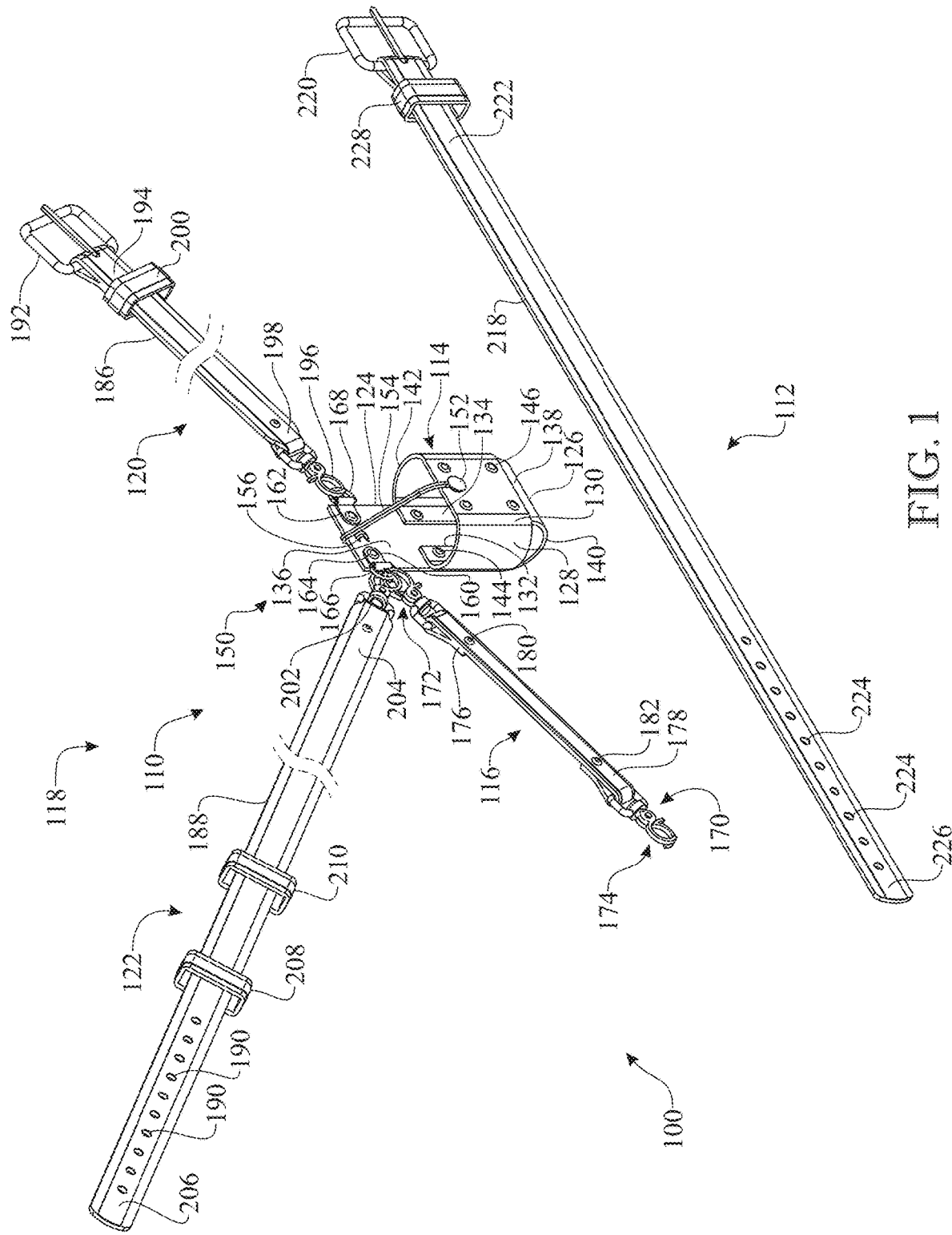
FIG. 1 presents a top, front isometric view of a belt strap and multi-strap holster accessory formed according to a method of manufacturing a waterproof strapped accessory of the present invention.

Referring initially to FIG. 1, a waterproof strapped accessory assembly 100 is illustrated in accordance with an exemplary embodiment of the present invention, configured as for instance an accessory holder and a supporting belt. As shown, the accessory assembly 100 of the present embodiment generally includes a multi-strap accessory holder 110 and a support or first responder pants belt 112 for carrying the weight of the multi-strap accessory holder 110 and any additional equipment supported thereon.

The multi-strap accessory holder 110 is provided to carry a wide variety of operational equipment (not shown) on the person of a first responder. The multi-strap accessory holder 110, in this particular embodiment, includes a holster 114, an accessory strap 116 and a detachable support strap assembly 118 having a first detachable support strap 120 and a second detachable support strap 122. The straps 116, 120 and 122 are engageable with one another and/or the holster 114. It should be noted that the disclosed multi-strap accessory holder 110 described herein is illustrative only and that many other configurations of multi-strap accessory holders 110 or strapped accessories are contemplated; for example, it is contemplated that the strapped accessory can include multiple holsters 114 or similar holsters, no holsters, more than one accessory strap 116, pouches or pockets suspended from the multi-strap accessory holder 110, etc.

In this embodiment, the holster 114 is formed from two pieces of material including a J-shaped supporting panel 124 having a curved bottom portion 126 for supporting the weight of an accessory carried in the holster 114 and a curved side panel 128 affixed to the J-shaped supporting panel 124. The curved side panel 128 has a center portion 130 and first and second free ends 132 and 134. The J-shaped supporting panel 124 has a back panel 136 and a front panel 138 extending from opposite sides of the curved bottom portion 126.

The holster 114 can be formed from a bulk thermal polyurethane (TPU) latex free coated polyester (preferably nylon) webbing material. One such material is BioThane® available from BioThane Coated Webbing Corp. Unless expressed otherwise, the term "BioThane®" will be used generically throughout the present disclosure to refer to any thermal polyurethane (TPU) latex free coated polyester (preferably nylon) webbing material used to manufacture the present invention. The shapes of the J-shaped supporting panel 124 and the curved side panel 128 can be formed by cutting the shapes from the bulk material with a thermal laser cutter which also fuses or seals the peripheral edges, such as the peripheral edge 140 of the J-shaped supporting panel 124 and the peripheral edges or free ends 132, 134 of the curved side panel 128 in a manner described in more detail hereinbelow. The laser cutter also forms and seals inner peripheral edges of any holes (not shown) formed through the J-shaped supporting panel 124 and the curved side panel 128 for receipt of rivets or other hardware as discussed hereinbelow.

The use of a thermal laser cutter to form the shapes of and holes in the various straps, holsters, holders, belts, etc. provides a great advantage over simple mechanical cutting with a blade in that the thermal laser cutter fuses or seals the material as it cuts. For example, thermal laser cutting as disclosed herein renders the resulting shapes or cut parts waterproof along the cut edges and contributes to produce a fully waterproof accessory. The choice of BioThane® as a preferred material for use in forming the disclosed waterproof strapped accessory assembly is based on its thermal melting point allowing the thermal laser cutter to fully seal any cut edges as well as its non-porous characteristics which prevent the absorption of fluids as well as allowing for ease of field cleaning. Other similar materials may be used in the disclosed method depending on the availability, cost efficiency and/or desired flexibility.

To assemble the holster 114, first rivets 144 are inserted through the sealed holes (not shown) formed through the back panel 136 of the J-shaped supporting panel 124 and through the sealed holes (also not shown) formed through the first and second free ends 132 and 134, respectively, of the curved side panel 128. The first rivets 144 are then secured in known manner to affix the first and second free ends 132 and 134 to the back panel 136. The front panel 138 of the J-shaped supporting panel 124 is similarly affixed to the center portion 130 of the curved side panel 128 by inserting a second set of rivets 146 through holes (now shown) formed through the center portion 130 of the curved side panel 128 and the front panel 138 and secured therein in known manner as above.

Additionally, various hardware 150 may be provided on the holster 114 to retain equipment therein as well as releasably secure the holster 114 to other straps. For example, a button 152 may be provided through a hole (not shown) in the center portion 130 of the curved side panel 128 and secured therein. A stretchable cord 154, extending from one or more holes 156 formed through the back panel 136 of the J-shaped supporting panel 124, is provided to retain any equipment in the holster 114 and can be releasably secured to the button 152. It should be noted that the hardware 150, as well as any other hardware utilized in the waterproof strapped accessory assembly 100, is preferably formed of a bio-compatible, non-absorbent, easily cleanable and sterilizable, non-corroding material, such as stainless steel.

Likewise, a pair of mini-straps 160 and 162 may be formed by the method disclosed herein and secured to the back panel 136 of the J-shaped supporting panel 124 using rivets 164. The securement of the mini-straps 160 and 162 to the back panel 136 is loose enough to allow the mini-straps 160 and 162 to rotate relative to the J-shaped supporting panel 124 to allow for rotational movement of the mini-straps 160 and 162 as they are attached to other straps or equipment. The mini-straps 160 and 162 are provided with D-rings 166 and 168. The D-rings 166 and 168 are secured to the mini-straps 160 and 162, respectively, by inserting the mini-straps 160 and 162 through the D-rings 166 and 168 and folding the mini-straps 160 and 162 back over themselves prior to the insertion of the rivets 164.

A fully waterproof and easily field cleanable piece of equipment, i.e., the holster 114, is formed by method above and as disclosed in more detail hereinbelow. The remaining disclosed straps and belts are formed by the same method and will now be briefly described.

The accessory strap 116 is provided to retain other holsters, holders, straps or even directly—and releasably—attach to D-rings, loops, holes, etc. provided on the first responder's equipment. The accessory strap 116 is cut from bulk material by a thermal laser cutter which seals any cut edges and holes formed there through to provide a fully waterproof accessory strap 116. The accessory strap 116 includes hardware 170 in the form of a pair of rotatable, snap clasps 172 and 174, or spring loaded clasps, graspers or other releasable hardware which are secured to first and second ends 176 and 178 of the accessory strap 116 in the same manner as the D-rings 166 and 168 were secured to the mini-straps 160 and 162 described hereinabove.

It should be noted that the first and second ends 176 and 178 of the accessory strap 116 may be narrowed in width or tapered to better fit through the snap clasps 172 and 174 during assembly and to allow a degree of rotation therein. The narrowed first and second ends 176 and 178 are inserted through the snap clasps 172 and 174, folded back upon themselves as described above and secured by rivets 180 and 182. The snap clasp 172 on the first end 176 of the accessory strap 116 is used to releasably secure the accessory strap 116 to the mini-strap 160 on the holster 114. Specifically, the snap clasp 172 is releasably attached to the D-ring 166 of the mini-strap 160.

As noted hereinabove, the multi-strap accessory holder 110 of the present embodiment additionally includes support strap assembly 118 for affixing and supporting the multi-strap accessory holder 110 about a first responder's body. The support strap assembly 118 comprises the first and second detachable support straps 120 and 122 which are formed according to the method disclosed herein including being cut from bulk material by a thermal laser cutter which seals the peripheral edges 186 and 188 of the first and second support straps 120 and 122, respectively, and cuts out any adjustment holes 190 provided through the second support strap 122 and any holes for rivets, buttons, etc.

The first support strap 120 includes a buckle 192 secured to a first end 194 of the support strap 120 and a snap clasp 196 secured to a second end 198 of the first support strap 120. The buckle 192 and the snap clasp 196 are secured to the first support strap 120 in the manner described hereinabove with reference to the snap clasps 172 and 174 on the accessory strap 116. The first support strap 120 additionally carries a keeper 200 surrounding the first support strap 120 for receipt of the second support strap 122. The keeper 200 is formed from a similar shorter length of BioThane® in accordance with the method disclosed herein. The keeper 200 may be secured to the first support strap 120 or may be free to slide along the length of the first support strap 120. The snap clasp 196 is releasably attachable to the D-Ring 168 of the mini-strap 162 on the holster 114.

Likewise, the second support strap 122 includes a snap clasp 202 located at a first end 204 of the second support strap 122. A second end 206 of the support strap 122 is designed to fit through the buckle 192 of the first support strap 120 and to be secured thereto in a predetermined length by engagement of the buckle 192 with one of the adjustment holes 190. The keeper 200 retains any excess length of the second support strap 122. The second support strap 122 additionally carries a pair of keepers 208 and 210 slidably mounted along the length of the second support strap 122 for retention of any additional straps (not shown) attached to the multi-strap accessory holder 110.

In addition to the multi-strap accessory holder 110, the waterproof strapped accessory assembly 100 includes the belt 112 formed from a length of BioThane® according to the method described herein. As above, the strap 112 has a peripheral edge 218 sealed during the forming process. The belt 112 can be releasably attachable to the multi-strap accessory holder 110 to help support the weight of any equipment attached thereto. Alternatively or additionally, the belt 112 can directly hold additional holsters, cartridge or clip carriers, etc. formed according to the method disclosed herein. The belt 112 includes a buckle 220 attached to a first end 222 of the belt 112 and a series of adjustment holes 224 adjacent a second end 226 of the belt 112. A keeper 228 is provided along the length of the belt 112 to retain any strap material passing through the buckle 220. The adjustment holes 224 are also fully sealed during manufacture by thermal laser cutting to render the belt 112 fully waterproof.

Figure 2:
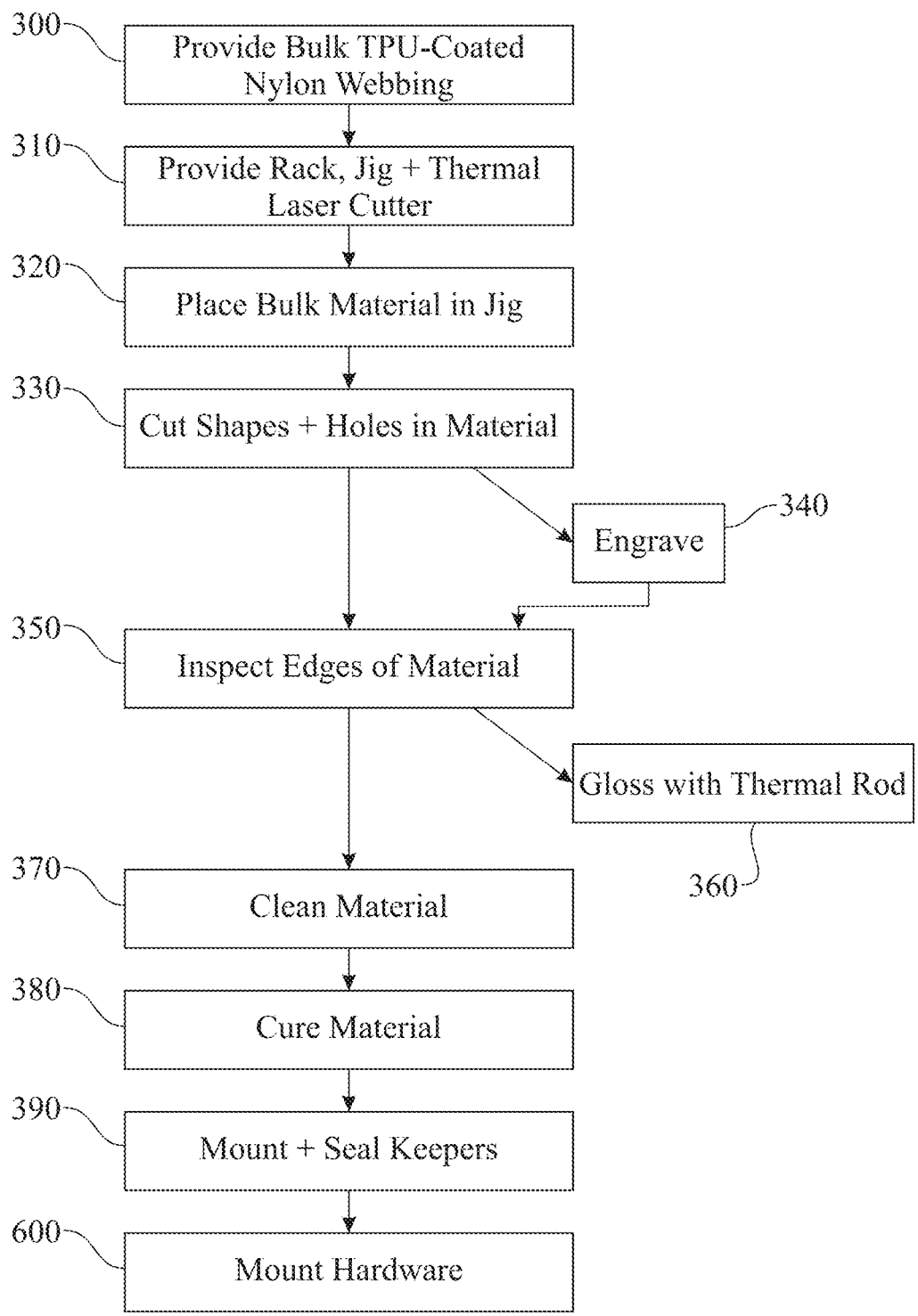
FIG. 2 a flow chart listing the method steps of the disclosed method of manufacturing a waterproof strapped accessory of the present invention.

Turning now to FIGS. 2-8, and initially with regard to FIG. 2, the method of manufacturing a waterproof strapped accessory will now be described in detail. The first step 300 is to acquire bulk material 400 (FIG. 4) to be formed into straps, belts, carriers, pouches, holsters, keepers, etc. The bulk material 400 can be a TPU-coated, nylon webbing material that is non-porous and has a melting temperature around 390° Fahrenheit (F.). This type of material is particularly suited to be used by first responders as it does not retain moisture and is easily field cleanable of dirt and chemical or biological contaminants. This material is also dielectric, preventing shock transmission, and has a breaking strength of approximately 1000 lbs. A preferred material for use in the disclosed method is, as noted hereinabove, BioThane®, available from BioThane Coated Webbing Corp. The material may also incorporate 3M® sourced Hi Vis reflective tape, glow-in-the-dark tape, etc. to increase the visibility of the waterproof strapped accessory assembly 100, and thus the presence of the first responders, in low light conditions.

Figure 3:
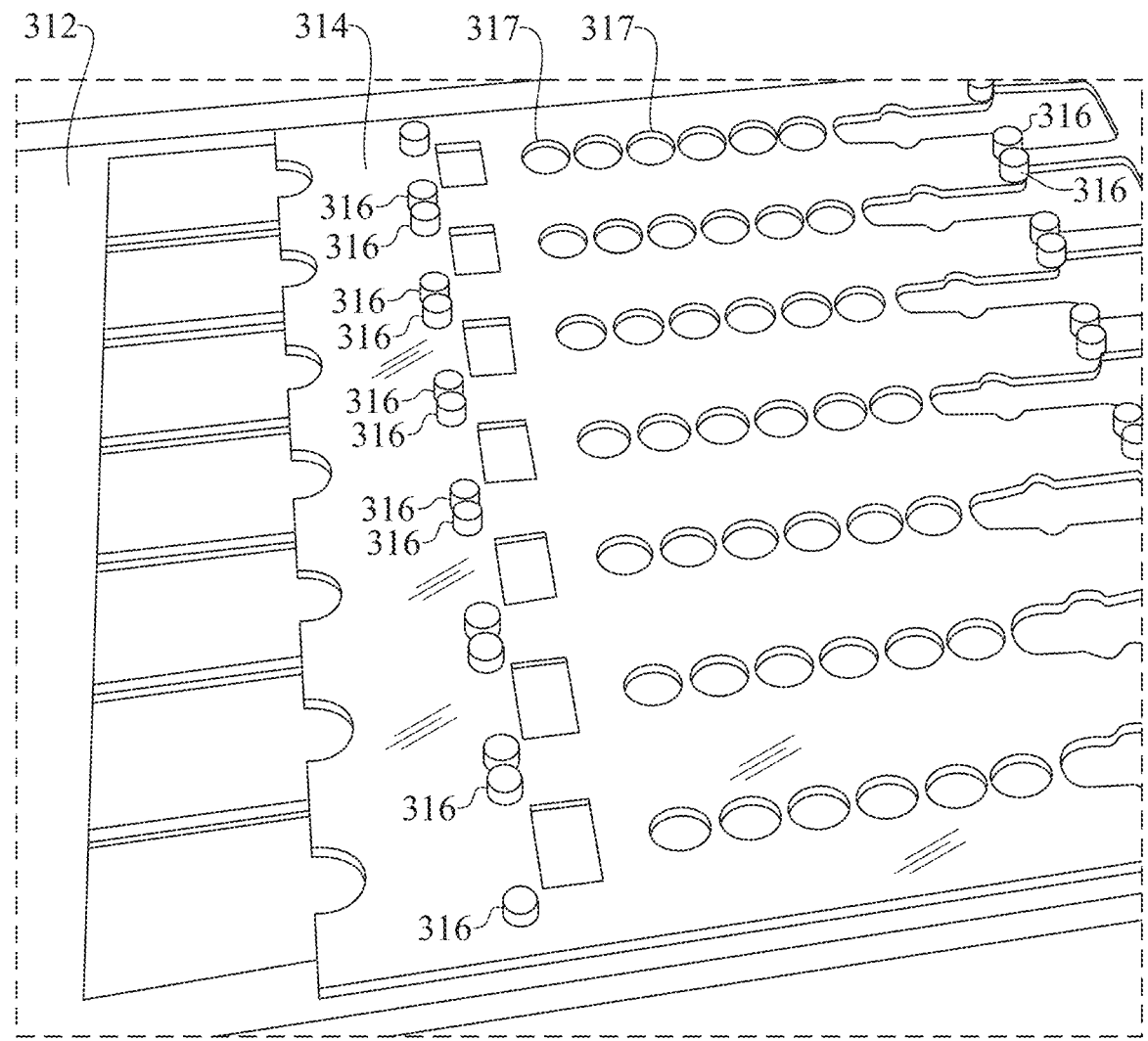
FIG. 3 presents a top front perspective view showing a rack and jig assembly utilized in the disclosed method of manufacturing a waterproof strapped accessory of the present invention.

With continued reference to FIG. 2 and also with reference to FIG. 3, the second step 310 includes providing a trough-like rack 312 for supporting a material retaining jig 314. The jig 314 has buttons or rollers 316 for aligning the strap-shaped bulk material 400. The jig 314 further includes a plurality of holes 317 formed through the jig 314 for purposes that will be described hereinafter.

Figure 4:
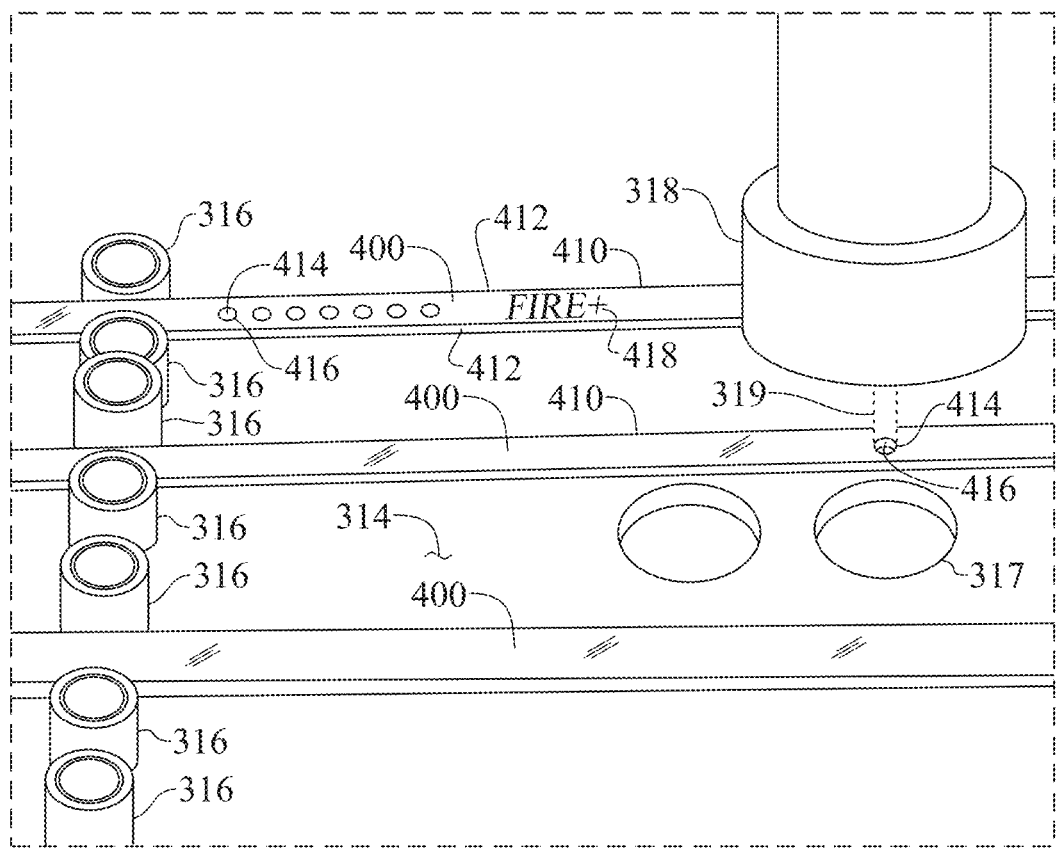
FIG. 4 presents a top front perspective view of raw strap material positioned on the rack and jig assembly and being laser cut, sealed and engraved by a laser thermal cutter utilized in the disclosed method of manufacturing a waterproof strapped accessory the present invention.

Referring now to FIGS. 2 and 4, a thermal laser cutter 318 is provided for cutting the edges of the straps or strap-shaped bulk material 400 as well as forming holes through the bulk material 400. The thermal laser cutter 318 operates to emit a laser beam 319 having an energy configured to sufficiently heat the bulk material 400 to ensure complete cutting, sealing and fusing of the bulk material 400, which is heat resistant up to 310° F. before softening to allow the material to remain pliable in adverse conditions. Additionally, the thermal laser cutter 318 may be used to engrave logos, warnings, descriptions or other indicia on the bulk material 400 as it is being formed into the straps, belts, carriers, pouches, holsters, keepers, etc., i.e., the desired articles. In some embodiments, the speed of travel and/or power of the laser beam 319 can be adjustable, to allow for the engraving or cutting of differing shapes, depths of cuts, or other effects.

The third step 320 includes positioning the raw, strap-shaped bulk material 400 on the jig 314 and aligning the material 400 between the buttons or rollers 316, as shown in FIG. 4. Thereafter, the thermal laser cutter 318 is utilized to perform a fourth step 330 in the method including cutting the bulk material 400 into the proper lengths and widths to form the desired articles. As the thermal cutter 318 engages the bulk material 400, it cuts through the bulk material 400 to form and shape a desired article 410, also shown in FIG. 5. As it cuts the material, it simultaneously melts, fuses or welds the cut edges to fully seal the cut edges rendering them waterproof thus creating a fully sealed peripheral edge 412. The thermal laser cutter 318 additionally cuts holes 414 through the desired article 410 also simultaneously sealing the inner edges 416 of the holes 414. The illustration of FIG. 4, for instance, shows the laser beam 319 cutting a hole 414 through the article 410 and sealing the inner wall or edge 416 of the hole 414.

The thermal laser cutter 318 can be operated by a Computer Numerically Controlled (CNC) type controller which can be programmed with the desired cuts such as, but not limited to, length and width of the desired article 410, size and number of holes for adjustment and/or rivets, etc. As shown in FIG. 4, the holes 317 in the jig 314 may be arranged in a predetermined manner matching that of the holes 414 to be cut through the material 400, to protect the jig 314 from repeated impacts by the laser beam 319. Additionally, while the desired article 410 is in the jig 314, the thermal laser cutter 318 may perform an optional fifth step 340 and utilized to engrave indicia 418 (e.g., "FIRE+") into the desired article 410. Since the engraving is being performed by the laser beam 319 form the thermal laser cutter 318, the engraved edges of the indicia 418 are also melted and sealed against moisture absorption. Such indicia 418 may include department logos or symbols, textual images such as names, instructions, etc. or any other engravings desired on the disclosed waterproof strapped accessory 100 for use by first responders and the like.

Figure 5:
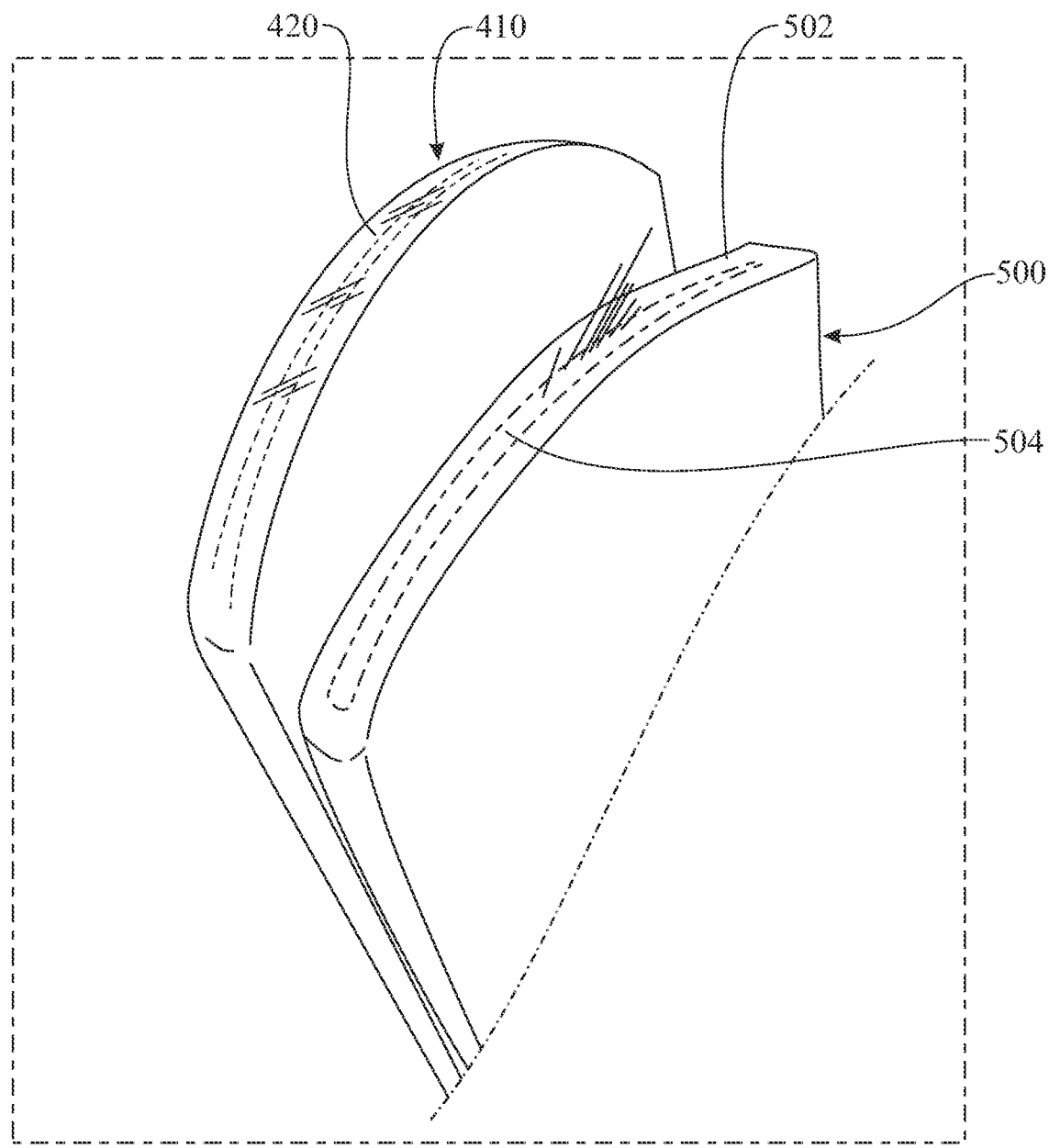
FIG. 5 presents an image comparing an end of a strap manufactured by mechanical cutting methods and an end of a strap thermally cut and sealed by the disclosed method of manufacturing a waterproof strapped accessory of the present invention.

Turning now to FIG. 5, there is shown a comparison of an end 420 of the desired article 410 compared to an end 502 of an article 500 formed by typical mechanical cutting utilizing a blade, punch, etc. As can be seen, the end 420 of the desired article 410 formed by thermal cutting is fully fused and sealed, while the end 502 of the article 500 formed by conventional mechanical cutting is not sealed but rather leaves a porous interior portion 504 exposed. This porous interior portion 504 is subject to water absorption and collection of dirt and biological contaminants rendering it dangerous to the user and difficult if not impossible to fully clean and/or sterilize.

Figure 6:
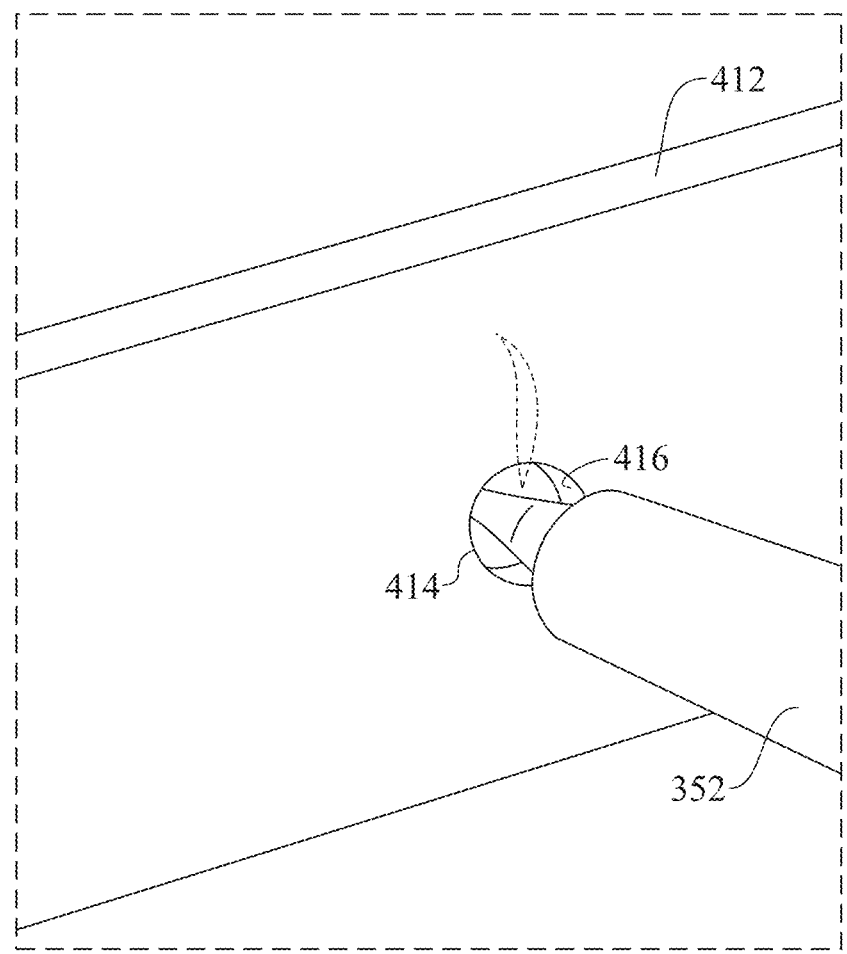
FIG. 6 presents a side perspective view of a hole of a strap manufactured by the disclosed method being inspected and glossed with a thermal rod utilized in the disclosed method of manufacturing a waterproof strapped accessory of the present invention.

Turning again to FIGS. 2 and also to FIG. 6, once the desired article 410 has been fully formed including cut to length and width and/or thickness and any adjustment or rivet holes formed as well as any desired engraving formed, the desired article 410 is removed from the jig 314 and a sixth step 350 is performed including inspecting all edges of the cuts both peripheral and inner for incomplete sealing. Should an incomplete seal in the desired material be discovered, a seventh step 360 is performed by applying a thermal rod 352 operating at about 390° F. to the not fully sealed peripheral edges 412 around the edges of the desired article 410 and/or the inner edges 416 of the holes 414 to render the desired article fully sealed and waterproof.

Figure 7:
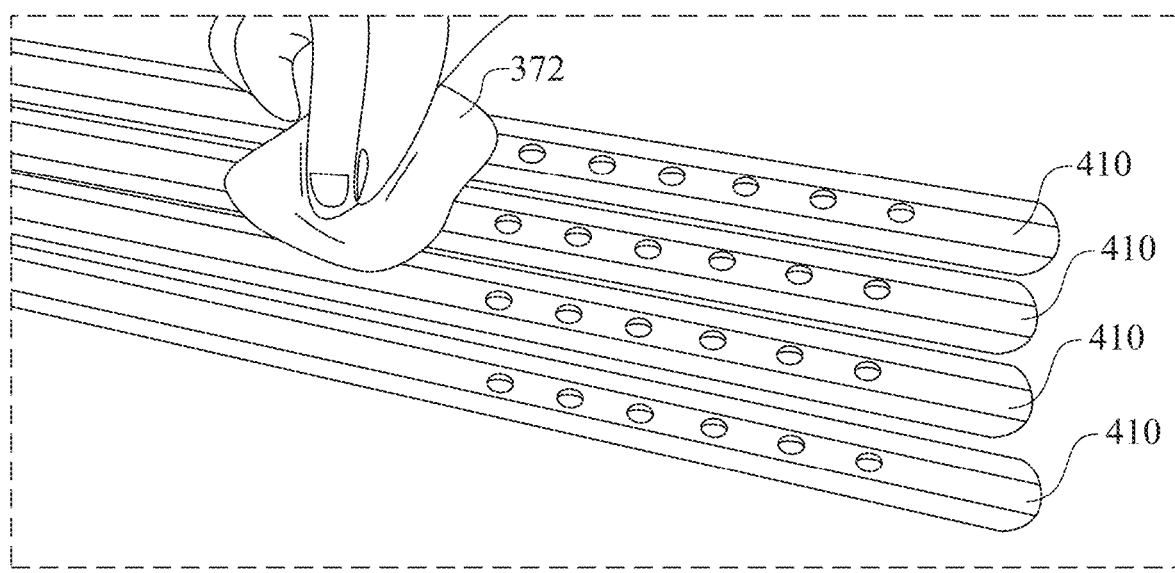
FIG. 7 presents a plurality of straps manufactured by the disclosed method being cleaned of residue in accordance with a step of the disclosed method of manufacturing a waterproof strapped accessory.

Referring to FIGS. 2 and 7, the fully sealed desired article 410 is then cleaned and cured in a seventh step 370 and an eighth step 380 to remove any residue and allow the thermal sealing to cool and harden. As shown, a micro fiber rag 372, or other application device, is used to clean or wipe down the desired article 410 with a cleaning solution, such as a 70% or 99% isopropyl alcohol solution, to remove any residue from the thermal cutting and sealing. After having been completely cleaned, the desired article 410 is set aside in the eighth step 380 to cure. Preferably, the article 410 is set aside to cure for approximately 12 hours in environmental conditions of approximately 70-74° F. and 50-50% relative humidity.

Figure 8:
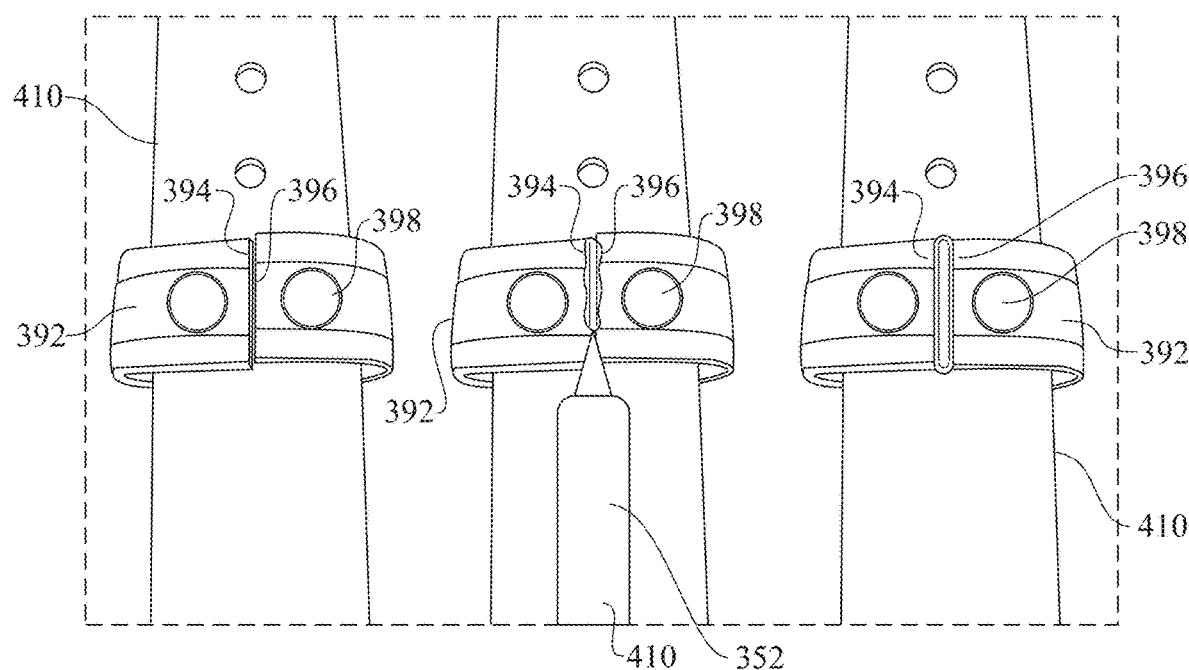
FIG. 8 presents a top perspective view of but joints of a keeper of a strap manufactured by the disclosed method being welded and sealed together by a thermal rod utilized in the disclosed method of manufacturing a waterproof strapped accessory.

With reference to FIGS. 2 and 8, the desired article 410 is then assembled with various other components. For example, in a ninth step 390, keepers, such as, but not limited to, keeper 392 is assembled to the desired article 410. This is accomplished by wrapping the keeper 392 around the desired article 410 and welding or sealing together butt joints or ends 394 and 396 of the keeper 392 together to fully seal the keeper 392. As noted above, the keeper 392 is fully sealed and is formed according to this disclosed method. A thermal rod, such as, but not limited to, the thermal rod 352 described hereinabove operating at about 3900 F, can be used to weld and seal the butt ends 394 and 396 together. Should it be desired to fix the keeper 392 in place on the desired article, rivets 398 may be used to affix the keeper 392 in place. The rivets 398 are inserted through holes (not shown) in the butt ends 394 and 396 and in holes (not shown) in the desired article 410 and affixed in known manner. The holes will have been cut, inspected and fully sealed as described herein above prior to affixing the rivets 398.

Finally, with continued reference to FIG. 2, various hardware 170, such as, but not limited to, the snap clasps 172, 174 and/or similar devices as well as the buckles 192, 220, etc. and or other hardware 170 is assembled to the finished article 410 in an tenth step 600 to produce the completed waterproof strapped accessory assembly 100.

The illustrations of FIGS. 9-14 depict a method of manufacturing a waterproof strapped accessory in accordance with a further illustrative embodiment of the invention. Similarly to the previous method, an amount of bulk material is obtained, in order to manufacture straps, belts, carriers, pouches, holsters, keepers, and/or other items therefrom. For instance and without limitation, the bulk material may include a sheet or panel of a bulk material 400 as described heretofore with reference to previous embodiments.

Figure 9:
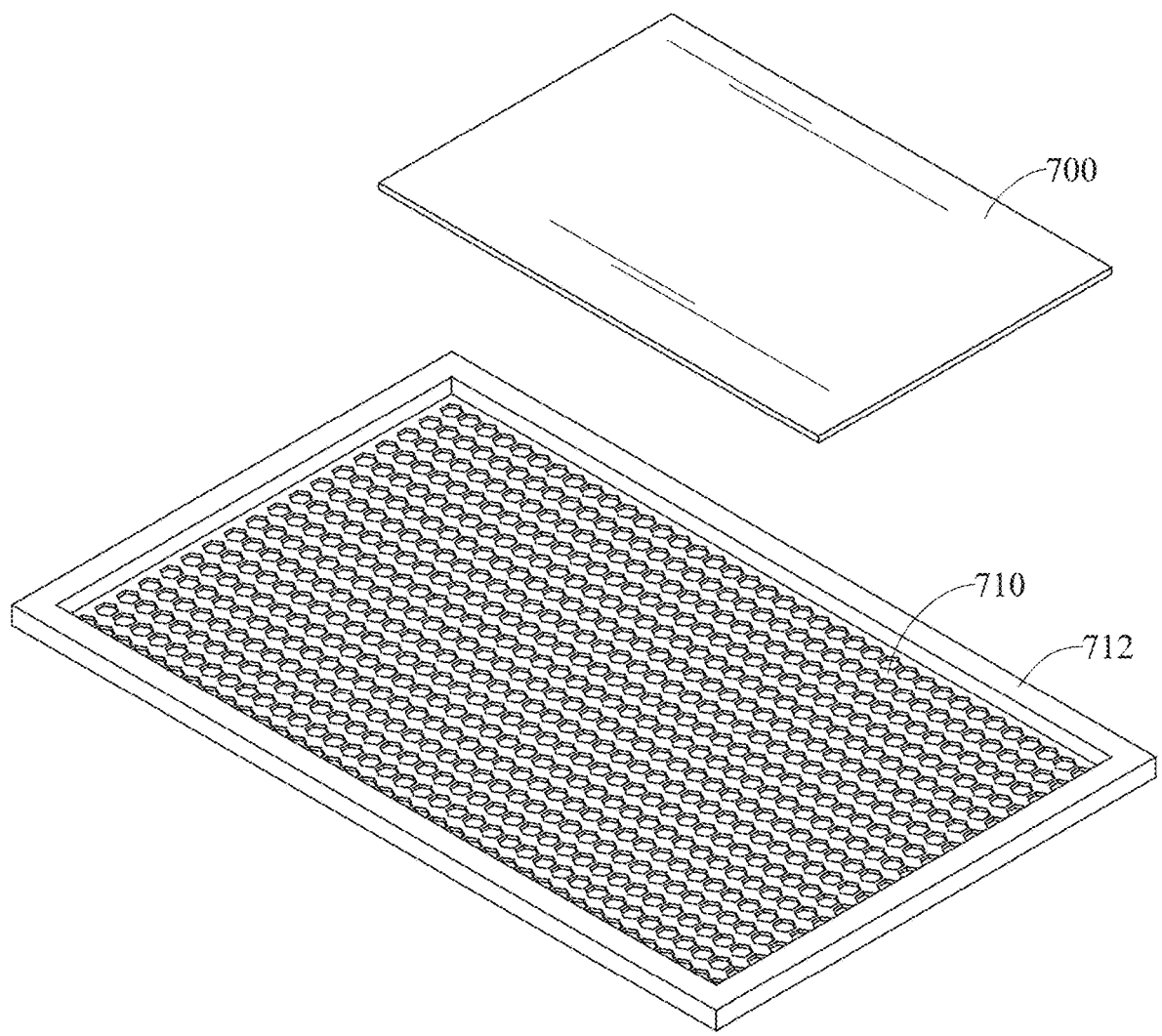
FIG. 9 presents a top perspective view of a further possible step in the method of manufacturing a waterproof strapped accessory of the present invention, in which a template is placed on a tray of a laser engraver bed.
Figure 10:
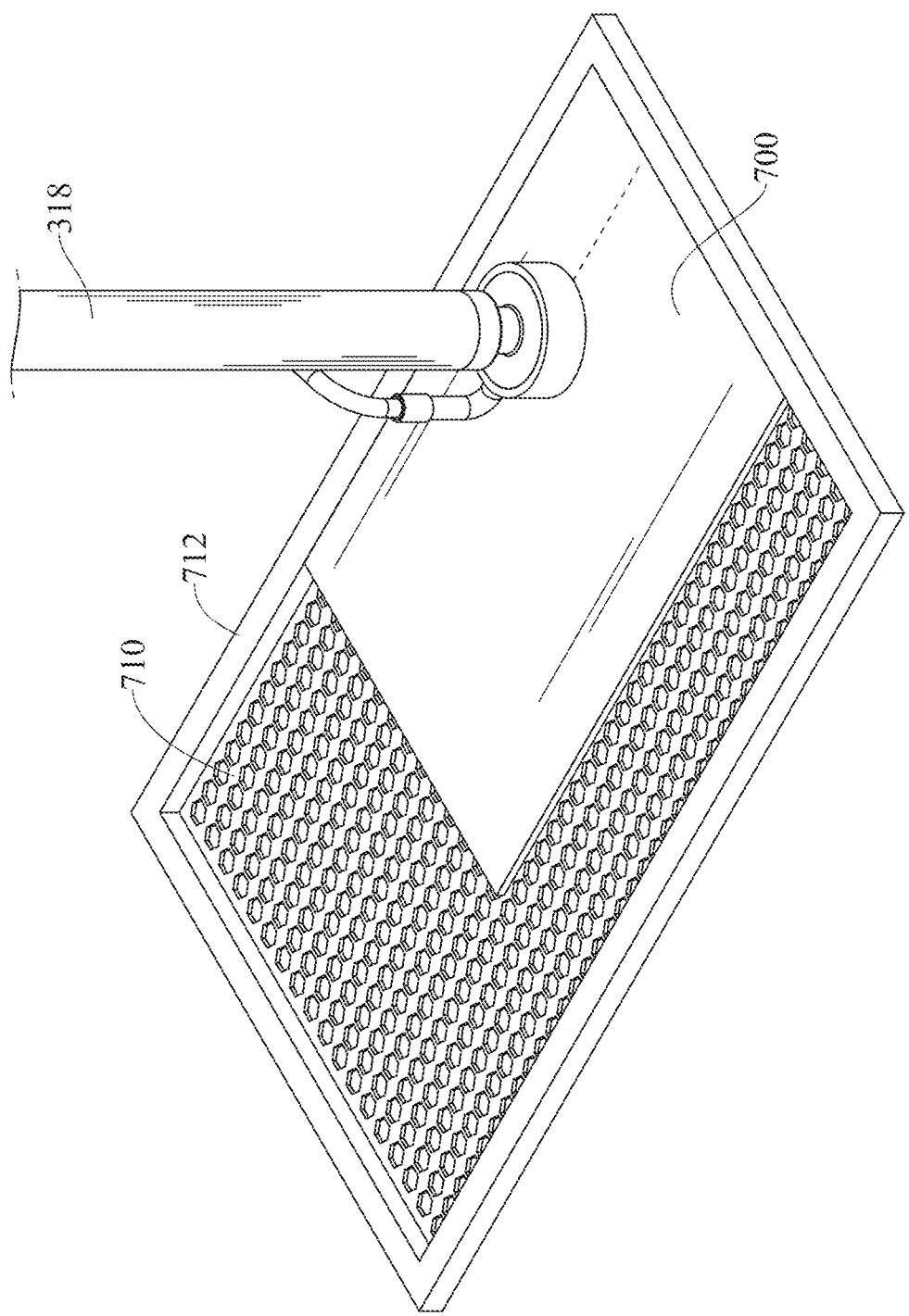
FIG. 10 presents a top perspective view illustrating a further step, in which the laser cutter cuts the template of FIG. 10 to form one or more openings configured accommodate the raw strap material.
Figure 11:
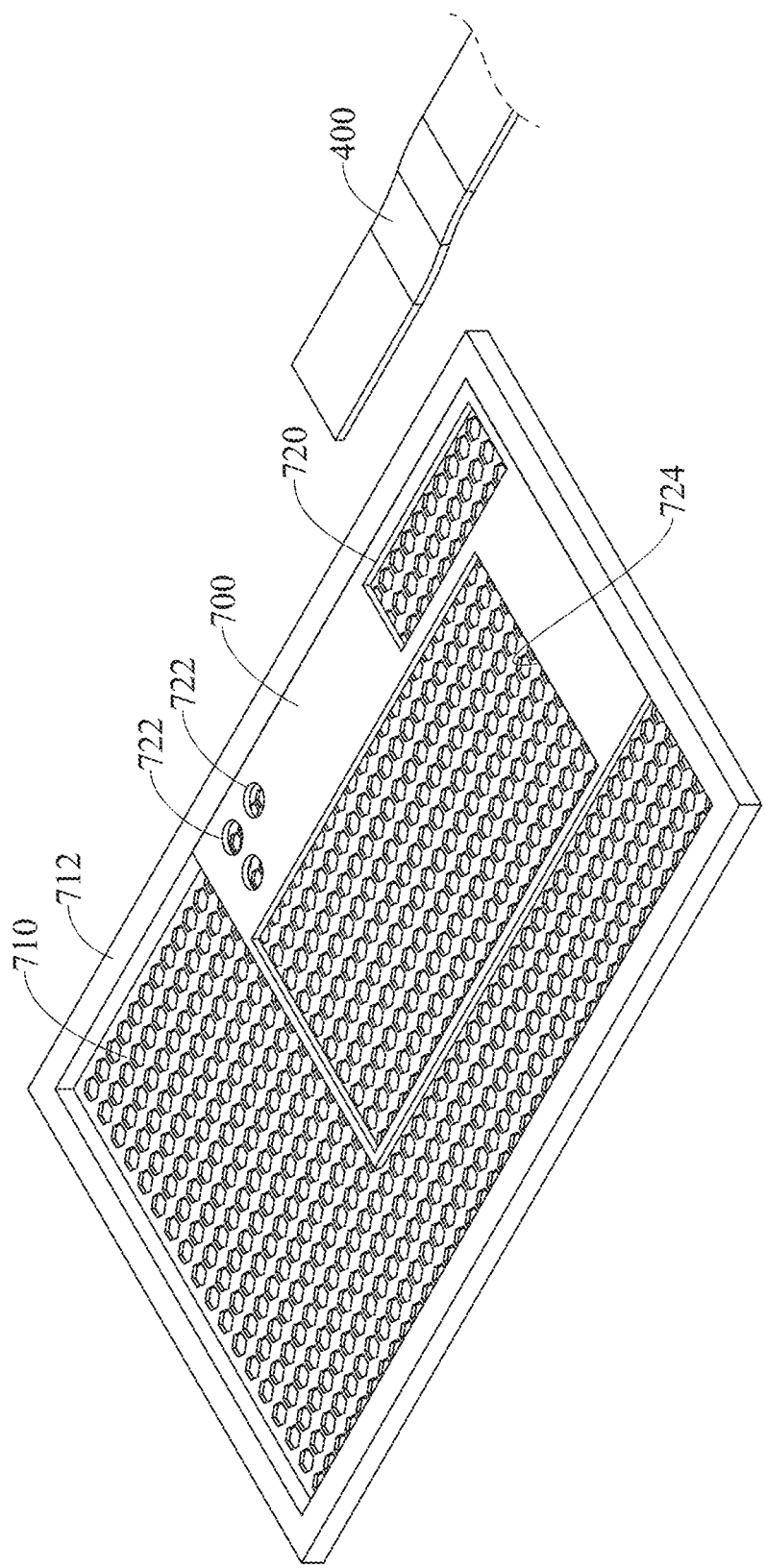
FIG. 11 presents a top perspective view illustrating a further step, in which the raw strap material is about to be fitted into an opening formed in the template as shown in FIG. 10, the opening configured to accommodate the raw strap material.

With reference initially to FIG. 9, a jig or template 700 is placed on a tray 710 which is in turn placed on or supported by a laser engraver bed 712. The template 700 shown herein is a plate or sheet, which can be made, for instance, of an acrylic or polycarbonate material. As shown in FIG. 10, the template 700 is then cut with a laser beam (not shown, but otherwise similar to laser beam 319 described heretofore) emitted by a thermal laser cutter 318 to form a through opening 720 (FIG. 11) configured to accommodate the outer dimensions of the material to be cut and sealed. For instance, in the present example, as best shown in FIG. 11, the through opening 720 is elongated and rectangular and has a width substantially equal to the width of a strap of bulk material such as, but not limited to, the bulk material 400 described heretofore with reference to previous embodiments. Additional openings, such as, but not limited to, circular openings 722 and a larger, rectangular opening 724 may be further formed in the template 700 by laser cutting through the template 700 using the thermal laser cutter 318, such as to manufacture additional parts or pieces (for example, a rectangular part using rectangular opening 724), or to assist in cutting holes through a part (for instance, using circular openings 722).

Figure 12:
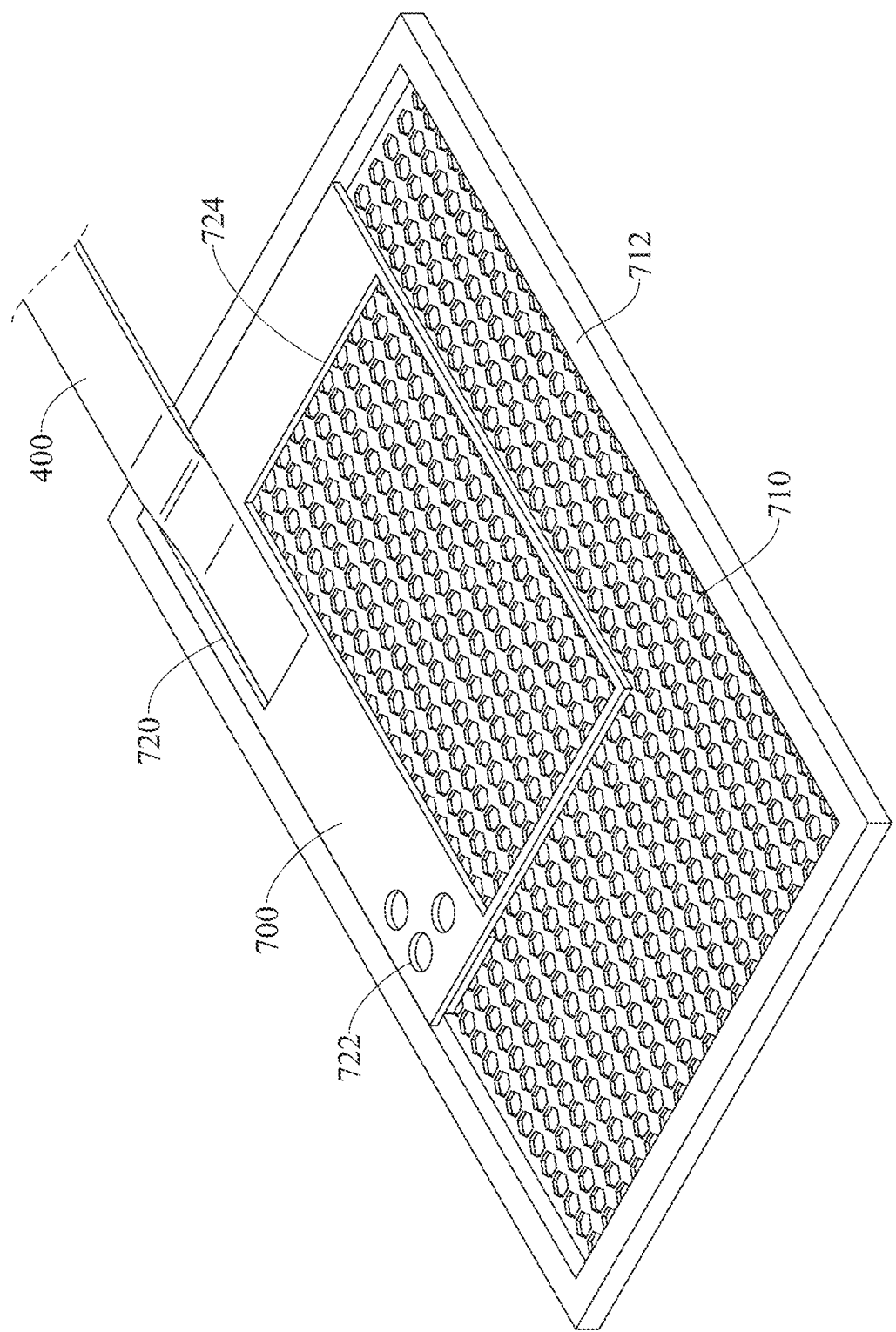
FIG. 12 presents a top perspective view, illustrating the raw strap material of FIG. 11 received in the opening formed in the template.
Figure 13:
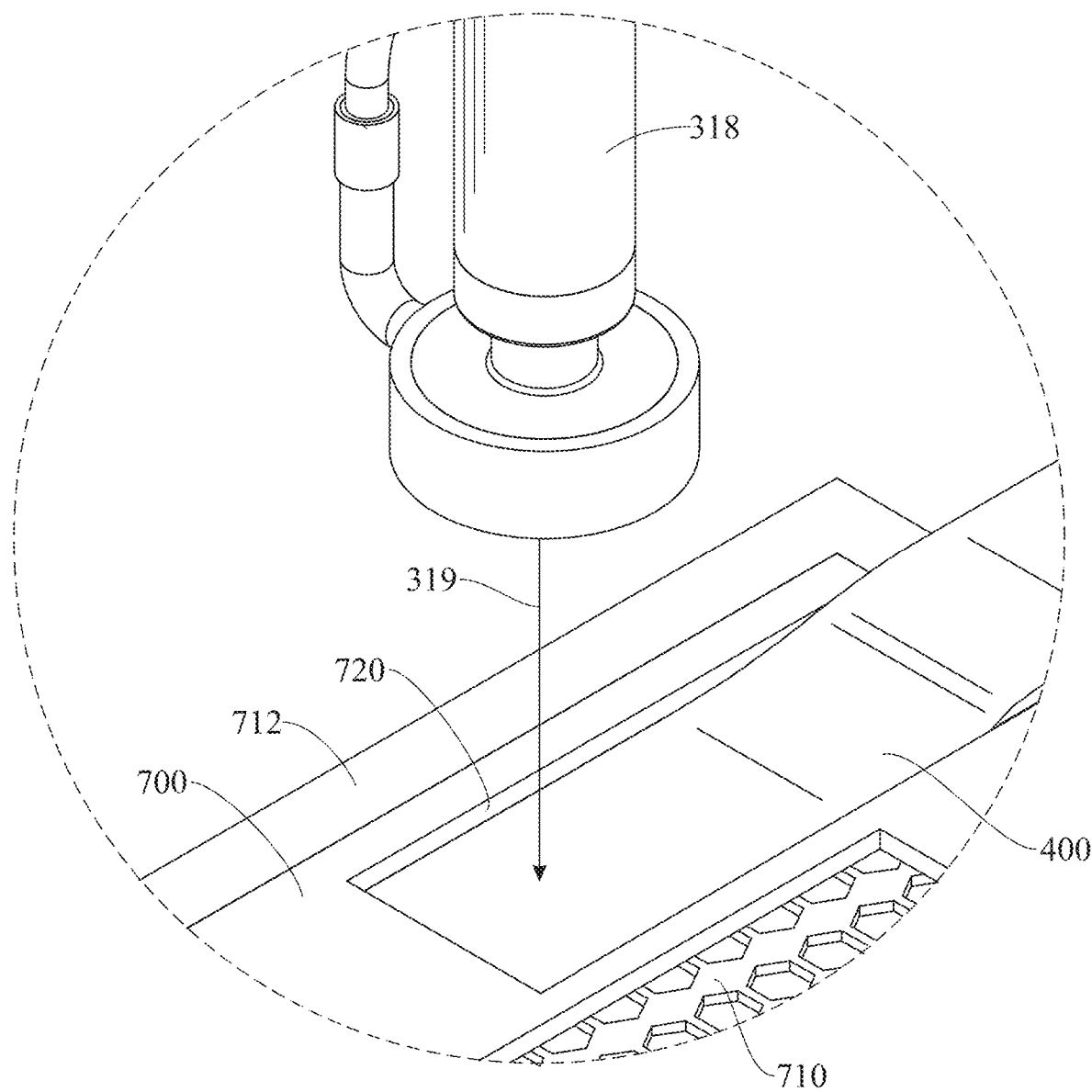
FIG. 13 presents a top perspective view illustrating a further step, in which the thermal laser cutter is applied to the raw strap material to form at least one of a hole, recess, indicia, slot, or other visible element or elements on the material.
Figure 14:
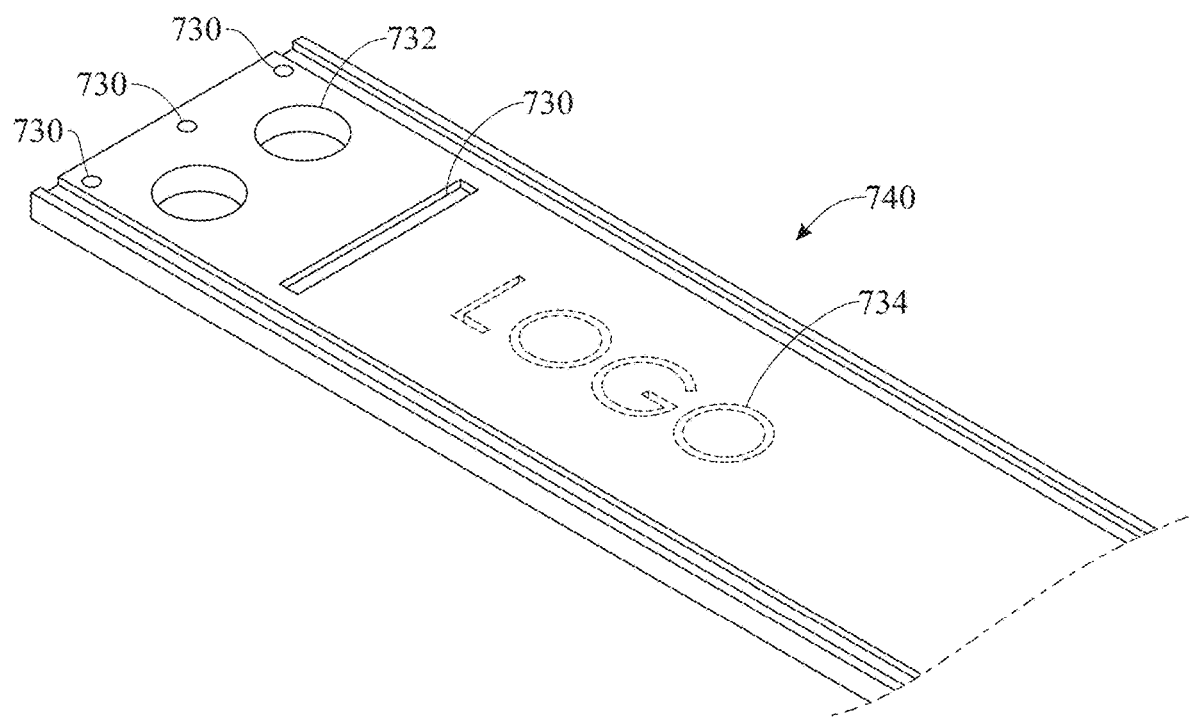
FIG. 14 presents a top perspective view of an example of strap material provided with recesses, holes and indicia such as by the steps of FIGS. 9-13.

Once the template 700 is arranged on the tray 710 and adequate openings are cut therethrough, the bulk material can be placed on the template 700 and accommodated into one or more openings. For example, a strap of bulk material 400 shaped and sized matching the elongated, rectangular through opening 720 may be fitted into the through opening 720, as shown in FIG. 12. In some embodiments, advancement of the strap of bulk material 400 to the correct, final position on the template 700 may be facilitated by one or more ball bearings, rollers, guides and/or stops comprised, for instance, in the template 700, similarly to the rollers 316 described heretofore with reference to FIGS. 3 and 4. Next, as shown in FIG. 13, the thermal laser cutter 318 may be operated to engrave and/or cut one or more recesses 730, through holes 732, indicia 734 and/or other elements into or through the strap of bulk material 400 to obtain a fully sealed, formed article 740, an example of which is shown in FIG. 14.

The template process above allows to efficiently manufacture fully sealed laser cut components. Once the desired finished component (e.g., article 740) is built to specifications, one or more cutting templates 700 are made with acrylic or polycarbonate plates and optionally provided with the appropriate ball bearings, rollers, guides and/or stops. Feeding and placement of the bulk material (e.g., bulk material 400) into the jig may be done rapidly via manual or step motor feed with repeatable results to, for instance, 0.001 inch.

Thus, in this manner the disclosed method produces a fully sealed and easily field cleanable set of equipment support straps for use by first responders or other persons, such as, but not limited to, life guards, campers etc. that require fully sealed strap accessories.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method of manufacturing a waterproof strapped accessory, comprising the steps of:
providing a raw thermal polyurethane-coated webbing material and a thermal laser cutter;
obtaining an article having at least one waterproof peripheral edge by cutting the webbing material using the thermal laser cutter, wherein the article comprises a strap;
inspecting a periphery of the article to identify an incompletely sealed peripheral edge of the article;
sealing the incompletely sealed peripheral edge by applying a thermal rod to said incompletely sealed peripheral edge;
applying the thermal laser cutter to the article such that a hole is formed in the article, the hole defined by an inner edge of the article, and such that at least part of the inner edge of the article is rendered waterproof by the thermal laser cutter;
sealing a remaining part of the inner edge defining the hole by applying a thermal rod to said inner edge defining the hole; and
cleaning the article with a cleaning solution comprising an isopropyl alcohol solution.

2. The method of claim 1, wherein the step of sealing the incompletely sealed peripheral edge comprises applying the thermal rod onto the incompletely sealed peripheral edge with the thermal rod set to a temperature of 390° F.

3. The method of claim 1, wherein the cleaning solution comprises a 70% to 99% isopropyl alcohol solution.

4. The method of claim 1, further comprising the steps of:
obtaining a template;
forming an opening in the template, wherein the opening is configured to accommodate the webbing material; and
fitting the webbing material into the opening prior to using the thermal laser cutter.

5. The method of claim 4, wherein the template is made of at least one of an acrylic material and a polycarbonate material.

6. The method of claim 4, wherein the opening and webbing material are elongate in shape and a width of the opening matches a width of the webbing material.

7. The method of claim 1, further comprising a step of tapering an end of the article to a narrower width by applying the thermal laser cutter to said end.

8. The method of claim 1, further comprising a step of applying the thermal laser cutter on a surface of the webbing material to engrave indicia on the surface.

9. The method of claim 1, further comprising a step of applying the thermal laser cutter on a surface of the webbing material to form a recess on the surface.

10. The method of claim 1, further comprising the steps of:
mounting a keeper on the article; and
sealing opposite ends of the keeper to each other by placing the opposite ends adjacent one another and applying a thermal rod to the opposite ends.

* * * * *